July 28, 1953 — W. DEAN — 2,647,257
NONAMBIGUOUS CYCLE MATCHING SYSTEM
Filed Jan. 22, 1948 — 2 Sheets-Sheet 1
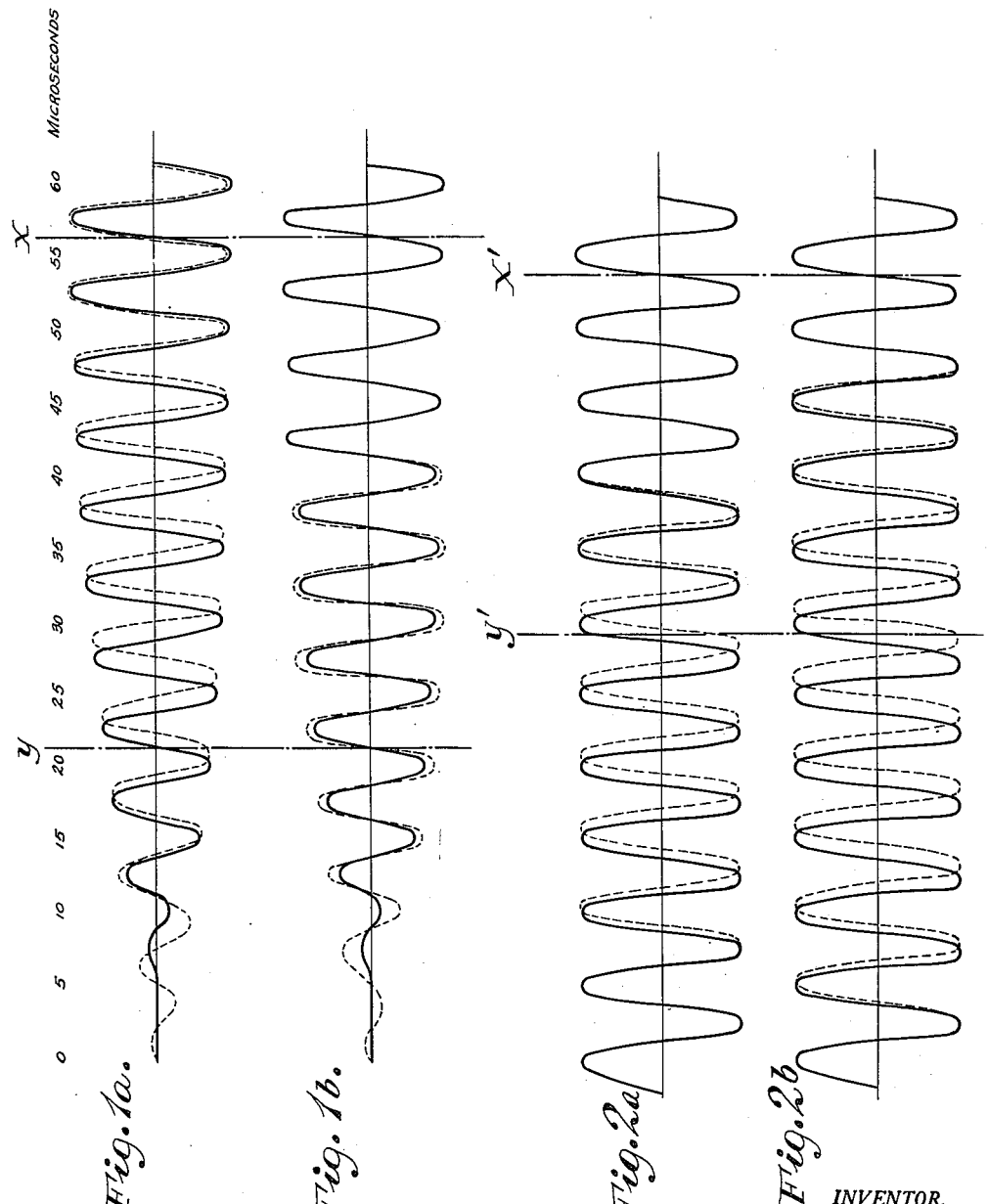
INVENTOR.
WALTER DEAN
BY
ATTORNEY July 28, 1953 W. DEAN 2647,257
NONAMBIGUOUS CYCLE MATCHING SYSTEM
Filed Jan. 22, 1948 2 Sheets-Sheet 2

INVENTOR.
WALTER DEAN
BY
Paul B. Hunter
ATTORNEY

Patented July 28, 1953

2,647,257

UNITED STATES PATENT OFFICE 2,647,257

NONAMBIGUOUS CYCLE MATCHING SYSTEM

Walter Dean, Hempstead, N. Y., assignor to The Sperry Corporation, Great Neck, N. Y., a corporation of Delaware Application January 22, 1948, Serial No. 3,735

23 Claims. (Cl. 343—105)

This invention relates to improvements in methods and apparatus, for comparing two equal frequency signals in phase without cyclic ambiguity, by means of phase modulating said signals.

This invention may be particularly applied to improving the accuracy of present loran systems, and will be explained with reference to such systems although the technique of the invention is not limited to this application.

Present loran systems endeavor to employ cycle matching of the radio frequency cycles, in an effort to improve system accuracy over that possible by the previous method, of merely matching the pulse amplitude modulations. However, errors of one or more full cycles are liable to occur because the matching of the pulses is not accurate enough to resolve cyclic ambiguity of the radio frequency cycle matching.

This invention provides methods and means for resolving this cyclic ambiguity by phase modulating the radio frequency cycles in synchronism or in a definite phase relationship. When the phase modulated signals are received at the receiving location, it is quite easy to match them without cyclic ambiguity, as the phase modulations make the mismatch readily apparent.

Accordingly, an object of this invention is to provide improved methods and means for comparing two equal frequency signals in phase including means to resolve cyclic ambiguity of said phase comparison.

Another object of the invention is to provide methods and means for radio frequency cycle matching without cyclic ambiguity.

Another object of the invention is to provide methods and means for radio frequency cycle matching including means for resolving cyclic ambiguity by phase or frequency modulating said radio frequency signals.

Another object of the invention is to provide methods and means for radio frequency cycle matching, including means to resolve cyclic ambiguity of said cycle matching by phase or frequency modulating said radio frequency signals, and means for resolving cyclic ambiguity of said phase modulation comparison, by pulse modulating said signals and comparing said pulse modulations.

Another object of the invention is to provide methods and means for improving the accuracy of loran navigation systems by providing means to match radio frequency cycles accurately and without cyclic ambiguity.

These and other objects and advantages of the invention will become apparent in the following specification and drawings of which:

Figs. 1 and 2 are pulse modulated wave forms illustrating the principles of the invention;

Fig. 1 shows typical pulse modulated signals comprising wave forms of a pair of phase modulated waves. The radio frequency waves shown are on the leading edge of the pulse and are therefore gradually increasing in amplitude. Fig. 1A shows tow phase modulated pulses which are mismatched one full cycle of the carrier frequency, although having an apparent match at X. Fig. 1B shows ordinary pulses mismatched one radio frequency cycle.

The pulsed waves are apparently matched at X, but at Y a mismatch is apparent in the phase modulated pulsed waves in Fig. 1A, whereas the mismatch cannot be ascertained in the ordinary pulses of Fig. 1B. Threfore, it is seen that a cyclic mismatch is much more readily apparent in the phase modulated pulses of Fig. 1A than in ordinary pulses of Fig. 1B. The waves shown are 200 kc. waves phase modulated at 20 kc., and the pulse rise time is approximately 50 microseconds.

In a specific application, such as a loran measurement, a mismatch will be readily apparent, by showing about five cycles of the waves, on a cathode ray indicator.

Fig. 2 shows constant amplitude radio frequency waves suitable for loran use. These are 200 kc. waves phase-modulated at 20 kc. A phase modulation index of .675 provides a maximum time displacement of the cycles of .5 microsecond, has been found satisfactory in a specific design. Fig. 2A shows an apparent match at X and a mismatch of one cycle at Y.

Fig. 2B shows an apparent match at X and a mismatch of two cycles at Y. These two figures illustrate that a mismatch of two or more cycles, is even more readily discernable than a mismatch of one cycle.

If the radio frequency, the phase modulation frequency, and the pulse repetition frequency are properly chosen, the system may be arranged so that the phase modulation comparison resolves cyclic ambiguity of the radio frequency cycle comparison, and the pulse modulation comparison resolves cyclic ambiguity of the phase modulation comparison, thereby greatly increasing the accuracy of present loran operation. That is, the phase modulations bridge the gap between the pulse comparison accuracy and the individual cycle matching accuracy, so that there are no full cycle errors or ambiguities in the cycle matching.

Figure 3:
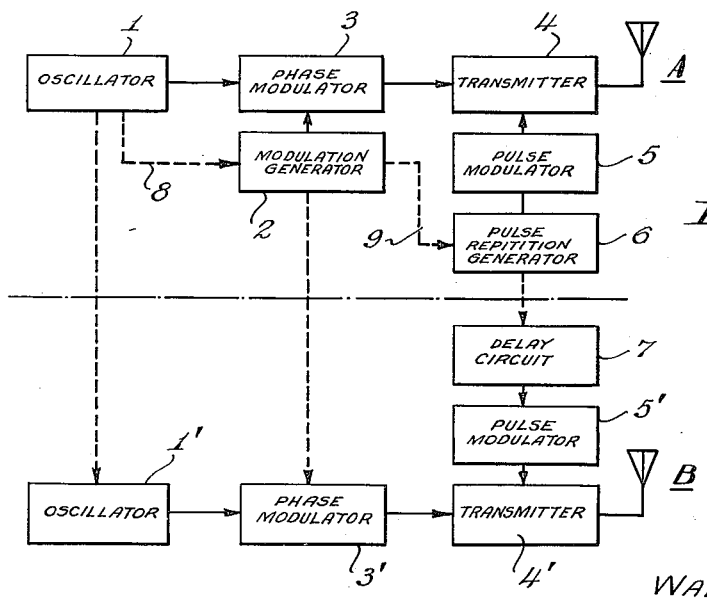
Fig. 3 is a schematic diagram of transmitting apparatus embodying the invention.

Fig. 3 illustrates transmitting apparatus embodying the invention comprising a pair of loran transmitting stations A and B which operate according to the principles of loran, which are discussed in the November and December 1945 issues of Electronics.

Master station A includes radio frequency oscillator 1, which may be a conventional crystal controlled oscillator of high stability, and modulation generator 2, a low frequency generator of good stability. The radio frequency output from oscillator 1 is phase modulated at the frequency of modulation generator 2 in phase modulator 3. The phase modulator 3 may be, for instance, one of the types shown by Terman in his Radio Engineers Handbook on page 583, or other conventional types. Frequency modulators may be used in place of phase modulators. The phase modulated output of modulator 3 is applied to transmitter 4 which includes conventional power output stages. The transmitter 4 output is adapted to be pulse modulated by pulse modulator 5 at the pulse repetition frequency generated by pulse frequency generator 6. The pulse modulator 5 may be of a known type such as used in present loran apparatus. Alternatively, the two lower frequencies, that is the phase modulating frequency and pulse repetition frequency may be obtained by dividing the frequency of oscillator 1.

Slave station B is identical with master station 1 except that its oscillator 1' is synchronized by oscillator 1 of station A. This synchronization may be performed by one of the methods described by Terman in the Radio Engineers Handbook on pages 511 and 626 and may be done by land line or radio lines. The phase modulators 3 and 3' and pulse modulators 5 and 5' are similarly synchronized. It is desirable to introduce an arbitrary delay between master and slave pulses in accordance with conventional loran practice in order to identify the respective pulses, and this may be done by a delay circuit 7. Thus, the outputs of the two stations will be waves as shown in Fig. 1, that is, synchronized waves phase modulated and also pulse amplitude modulated.

Figure 4:
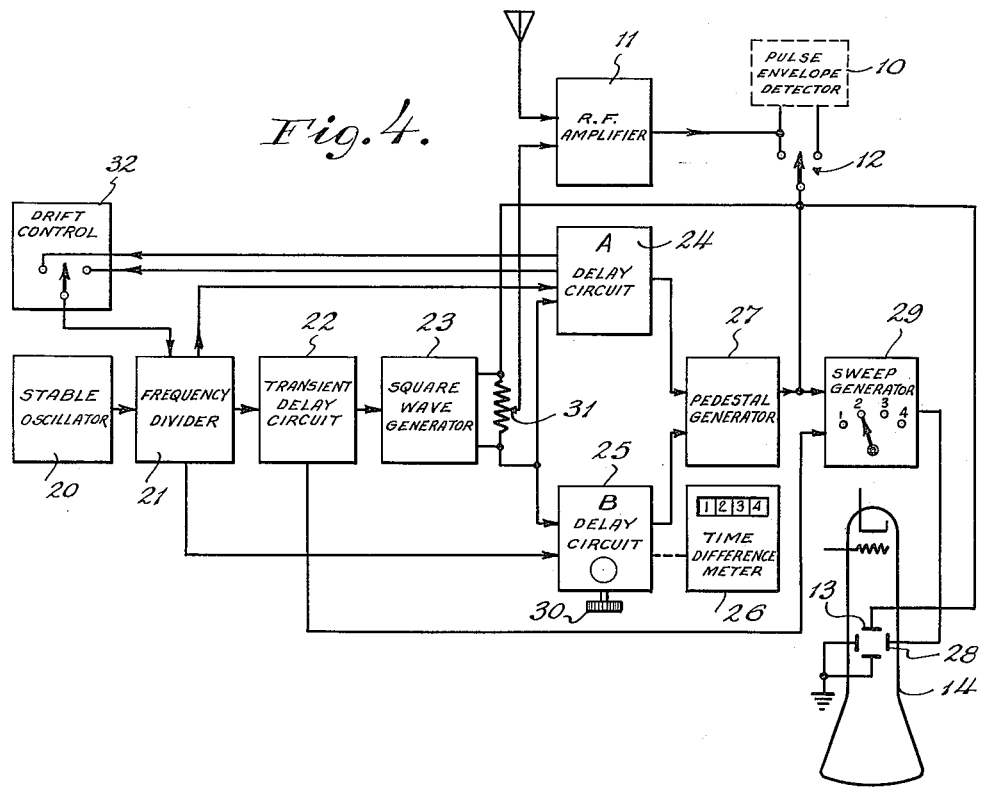
Fig. 4 is a schematic diagram of receiving apparatus embodying the invention.

Fig. 4 shows receiving and timing apparatus adapted to cooperate with the transmitting apparatus of Fig. 3. The receiving apparatus is conventional, Fig. 4 being the Sperry Mark 1 loran receiver, slightly modified as will be explained. The details of all these circuits are published in the instruction book for the above equipment and will not be discussed here in detail as they are all conventional, and a detailed discussion is not necessary to an understanding of the invention.

The invention resides in the phase or frequency modulating of radio frequencies to thereby provide non-ambiguous matching of the radio frequency cycles. The coarse time measurement, that is, the pulse matching technique remains the same as in conventional loran. The only additions to conventional loran receiving apparatus required are the selector switch 12, and an additional "very fast" sweep voltage output from the sweep generator 29, which is utilized to provide about five radio frequency cycles on the cathode ray screen, in order that any cyclic ambiguity in the cycle matching will be readily apparent.

Radio frequency signals are received and amplified by R. F. amplifier 11 and applied through switch 12 to the vertical plates 13 of cathode ray tube 14. The received pulse envelope may be obtained by means of detector 10 and applied to the cathode ray tube indicator through the other position of switch 12.

All the remaining circuits of Fig. 4, are timing circuits designed to measure the time interval between the loran pulses. Oscillator 20 provides a stable reference frequency which is divided by frequency dividers 21. The output of frequency dividers 21 triggers on transient delay circuit 22, which introduces an arbitrary delay, to avoid effects due to transients arising in the frequency dividing operation. The output of transient delay circuit 22 triggers square wave generator 23, the output of which is a square wave at the loran repetition rate.

The output of the square wave generator 23 has three uses. First, it is applied to the vertical plates of cathode ray tube 14 in order to separate the traces and thereby provide a separate sweep trace for each loran signal in accordance with standard loran practice. The second use of the square wave is to provide an adjustable amplitude voltage on potentiometer 31 which is applied to the gain of R. F. amplifier 11 in order to balance the amplitude of the signals received from the differently located loran stations. The third square wave output is used to trigger "on" the A delay circuit 24 and to trigger "on" the B delay circuit 25 exactly one-half pulse repetition interval later.

The function of the A delay circuit 24 is to introduce an arbitrary fixed delay into the system and it is triggered "off" by voltage from frequency divider 21. Also, two separate outputs are fed back from the A delay circuit 24 through drift control 32 to the frequency dividers 21. Drift control 32 selects the proper feed back to increase or decrease the recurrence rate and thereby "drift" the indications on the cathode ray indicator to right or left.

The B delay circuit is triggered "off" by an adjustable voltage from frequency divider 21, and it is this adjustment by means of phase shift control 30 that provides the loran time difference reading on indicator 26. The time difference meter 26 may be of the mechanical countertype and is geared to the adjustable phase shifter delay knob 30 of B delay circuit 25.

The output of A delay circuit 24 triggers "on" the pedestal generator 27, which provides a pedestal voltage which is superimposed on the first or master loran pulse in order to make the first, coarse time measurement. The B delay circuit, the output of which is variable in time, triggers the pedestal generator 27 to provide a B pedestal voltage which may be superimposed on the second or slave loran signal. The sweep voltages applied to the horizontal plates 28 of cathode ray tube 13 are provided by sweep generator 29 which provides sweep voltages of the varying time durations required for the time measuring operations. In the first or "slow" position the sweep is triggered "on" by the output of transient delay circuit 22 and in the "fast" sweep positions the sweep generator is triggered on by the output of pedestal generator 27.

The operation of the receiving apparatus of Fig. 4 is as follows:

1. With sweep generator 29 in the first or "slow" position the loran radio signals are received by radio frequency amplifier 11 and applied through pulse detector 10 to the cathode ray indicator 14 thereby applying the two pulse envelopes from the master and slave loran stations, to the cathode ray screen on separate traces. The drift control 32 is now adjusted until the master pulse is located on the upper pedestal, and the delay control 30 is adjusted until the lower pedestal is under the slave pulse.

2. The switch of sweep generator 29 is turned to the second position which provides sweep voltages corresponding in time duration to the tops of the pedestals of step 1 and the drift and delay controls 32 and 30 are adjusted until respective pulse envelopes are near the lefthand end of the sweep traces.

3. Sweep generator 29 is turned to the third sweep position which provides a much faster sweep and the controls are again adjusted to match the pulse envelopes very carefully. The trace separation is preferably eliminated in this step in order to superimpose the sweeps to provide better matching. Thus far the measuring procedure has been conventional loran technique.

4. Sweep generator 29 is turned to the fourth or "very fast" sweep and the switch 12 is turned to the lefthand position, which thereby applies about five radio frequency cycles, as illustrated in Fig. 1a, directly on the vertical plates of cathode ray indicator 14. Delay control 30 is carefully adjusted until the two radio frequency voltages are perfectly matched. At this point it is desirable to check back to step No. 3 and make sure the pulse envelopes are still matched.

After this final adjustment the time difference meter 26 will read the time delay between the signals to a very high accuracy. It is obvious that this accuracy is much greater than could be obtained by merely matching the pulse envelopes. As was explained in connection with Figs. 1 and 2, the radio frequency cycles are phase-modulated to avoid any probability of a mismatch of one or more cycles. If approximately five cycles are shown on the cathode ray indicator a mismatch of one cycle will be quite obvious. The matching of the pulse envelopes can be made sufficiently accurate in order to avoid cyclic ambiguity at the phase modulation frequency, whereas pulse matching generally cannot be made accurate enough to resolve cyclic ambiguity of the radio frequency cycle match.

To conclude, the invention resides in the method and means of resolving cyclic ambiguity of the phase matching operation, by means of phase modulating or frequency modulating the loran signals. Present loran apparatus may be readily adapted and improved according to the teaching of the invention by installation of suitable phase modulation apparatus at the transmitting stations. Existing conventional receiving apparatus need only be modified slightly as explained in connection with Fig. 4, in order to derive the benefits of improved accuracy as taught by the invention.

This technique of resolving cyclic ambiguity is not limited to phase modulation, as frequency modulation may be utilized as well, and it is not limited to loran navigation systems which are merely one illustration. The technique taught by the invention may be used to advantage wherever it is necessary to resolve cyclic ambiguity of phase measurements.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A method of resolving cyclic ambiguity in cycle matching radio frequency signals, comprising the steps of: phase modulating said signals in synchronism, comparing the modulated radio frequency signals in phase, and comparing the phase modulations to resolve cyclic ambiguity in said first comparison.

2. The method of resolving cyclic ambiguity in the cycle matching of equal frequency signals, comprising the steps of: separately generating at least two equal frequency signals in synchronism, phase modulating said signals in a definite time relationship, separately transmitting said signals, receiving said phase modulated signals, comparing the phase modulated signals in phase, utilizing the phase modulations to resolve cyclic ambiguity in said comparison.

3. Means to receive a plurality of equal frequency signals each having a plurality of separate amplitude and frequency modulations, means to compare said separate signals in phase and means to compare said separate modulations in phase to thereby resolve cyclic ambiguity of said first comparison.

4. Navigation means independent of flight history comprising receiving means, means to receive at least two separate equal frequency carrier signals each having at least two separate amplitude and frequency modulations, means to compare said separate equal frequency signals in phase, means to compare said separately received first modulations in phase and means to compare said other separately received modulations in phase.

5. A method of radio frequency cycle matching of two equal frequency signals without cyclic ambiguity, comprising the steps of: phase modulating said signals in synchronism, comparing the radio frequency signals in phase, and comparing said modulations in phase.

6. A method of radio frequency cycle matching of two equal frequency signals without cyclic ambiguity, comprising the steps of: frequency modulating said signals in synchronism, comparing the radio frequency signals in phase, and comparing said modulations in phase.

7. A method of radio frequency cycle matching of two equal frequency signals without cyclic ambiguity, comprising the steps of: generating two equal frequency signals in synchronism, phase modulating said signals in synchronism, separately transmitting said signals, receiving said signals, comparing said radio frequency signals in phase and comparing said modulations in phase.

8. In a radio navigation system of the type wherein equal frequency, phase modulated, continuous wave signals are transmitted from at least two separate locations; a receiver comprising radio frequency amplifying means to receive said signals, phase comparison means responsive to said amplifying means to compare said signals in phase, and modulation responsive means to resolve cyclic ambiguity of said phase comparison means.

9. In a radio navigation system of the type wherein frequency modulated, continuous wave signals are transmitted from at least two separate locations; a receiver comprising radio frequency amplifying means to receive said signals, phase comparison means responsive to said amplifying means to compare said signals in phase, frequency modulation responsive means to resolve cyclic ambiguity of said phase comparison means.

10. In a radio navigation system of the type wherein pulse modulated, phase modulated, continuous wave signals are transmitted from at least two separate locations; a receiver comprising radio frequency amplifying means to receive said signals, phase comparison means responsive to said amplifying means to compare said signals in phase, including means to resolve cyclic ambiguity in said phase comparison, pulse detecting means to obtain said pulse modulations and time comparison means responsive to said pulse detecting means to measure the time difference between said pulse modulations.

11. In a radio navigation system of the type wherein pulse modulated, frequency modulated, continuous wave signals are transmitted from at least two separate locations; a receiver comprising radio frequency amplifying means to receive said signals, phase comparison means responsive to said amplifying means to compare said signals in phase, including means to resolve cyclic ambiguity in said phase comparison, pulse detecting means to obtain said pulse modulations and time comparison means responsive to said pulse detecting means to measure the time difference between said pulse modulations.

12. A method of determining position by radio means comprising the steps of: transmitting equal frequency signals having a definite phase relationship from at least two separate locations; phase modulating said signals, said modulation frequency waves having a definite phase relationship; receiving said signals at the location to be determined; comparing said continuous wave signals in phase; and comparing said phase modulations in phase to resolve cyclic ambiguity of said first comparison.

13. A method of determining location by radio means comprising the steps of: transmitting equal frequency signals having a definite phase relationship from at least two separate locations; phase modulating said signals, said modulations having a definite time relationship; amplitude modulating said signals, said amplitude modulations having a definite time relationship; receiving said signals at the location to be determined; comparing said signals in phase; comparing said phase modulations in time to resolve cyclic ambiguity of said first comparison; and comparing said amplitude modulations in time to thereby resolve cyclic ambiguity of said second phase comparison.

14. A method of determining location by radio means comprising the steps of: transmitting equal frequency signals having a definite phase relationship from at least two separate locations; phase modulating said signals, said modulations having a definite time relationship; pulse modulating said signals, said pulse modulations having a definite time relationship; receiving said signals at the location to be determined; comparing said signals in phase; comparing said phase modulations in phase to resolve cyclic ambiguity of said first comparison; comparing said pulse modulations to thereby resolve cyclic ambiguity of said phase modulation comparison.

15. A hyperbolic navigation system independent of trip history comprising, means at at least two separate locations to transmit equal frequency signals in synchronism, means at said locations to phase modulate said signals in synchronism, receiving means at a third location responsive to said transmitting means to receive said signals, phase comparison means responsive to said receiving means to compare said signals in phase, said phase comparison means being also adapted to compare said modulations in phase to thereby resolve cyclic ambiguity of said first phase comparison.

16. Receiving means comprising means to receive phase modulated signals from two separate locations, means responsive to said receiving means to compare said signals in phase, and means responsive to said receiving means to compare said phase modulations in phase.

17. Navigation apparatus independent of voyage history comprising, means to receive a plurality of phase modulated signals, non-ambiguous means responsive to said receiving means to compare said signals in phase, including means responsive to said receiving means to compare said phase modulations in phase.

18. Navigation apparatus comprising, means to receive a plurality of equal frequency signals which are both phase and amplitude modulated, means responsive to said receiving means to compare said signals in phase, means responsive to said receiving means to compare said phase modulations in phase to thereby resolve cyclic ambiguity of said first phase comparison, and means responsive to said receiving means to compare said amplitude modulations in phase to thereby resolve cyclic ambiguity of said phase modulation comparison.

19. A method of comparing two equal frequency signals in phase without cyclic ambiguity comprising the steps of: modulating said two signals with amplitude and phase modulations having a definite phase relationship, transmitting said signals, receiving said modulated signals at a measuring location, comparing at least one of said modulations in phase and comparing said equal frequency signals in phase, whereby cyclic ambiguity of said phase comparison will be resolved by said modulations.

20. In a radio navigation system of the type transmitting phase synchronized equal frequency carrier waves and phase synchronized modulation signals on said carrier waves, said modulation signals having frequencies chosen to be utilized to resolve cyclic ambiguity in phase comparison of said radio frequency waves, those steps in the method of resolving cyclic ambiguity in the phase comparison of said two received equal radio frequency modulated signals which comprise, receiving said equal radio frequency signals, phase-comparing the cycles of said equal radio frequency signals, and phase-comparing said modulation signals to resolve the cyclic ambiguity of said first phase comparison.

21. Radio navigation transmitting apparatus comprising means at a first location to generate radio frequency signals and means adapted to phase modulate said radio frequency signals, means at a second location to generate radio frequency signals having a definite phase relationship to said first radio frequency signals and means adapted to phase modulate said second radio frequency signals, said phase modulation frequencies having a definite phase relationship.

22. In a radio navigation system of the type transmitting phase synchronized equal frequency carrier waves and phase synchronized modulation signals on said carrier waves, said modulation signals having frequencies chosen to be utilized to resolve cyclic ambiguity in phase comparison of said radio frequency waves, means to receive a pair of equal radio frequency carrier signals each having at least one modulation, means for phase-comparing the cycles of said radio frequency signals and means for phase-comparing said modulations to thereby resolve cyclic ambiguity of said first comparison.

23. In a radio navigation system of the type transmitting phase synchronized equal frequency carrier waves and phase synchronized modulation signals on said carrier waves, said modulation signals having frequencies chosen to be utilized to resolve cyclic ambiguity in phase comparison of said radio frequency waves, comprising receiving means to receive at least two separate equal radio frequency carrier signals each having at least one modulation, means to compare the cycles of said separate radio frequency signals in phase and means to compare said modulations in phase to thereby resolve cyclic ambiguity of said first phase comparison.

WALTER DEAN.

References Cited in the file of this patent

UNITED STATES PATENTS

| Number | Name | Date |
| --- | --- | --- |
| 1,877,858 | Hahnemann | Sept. 20, 1932 |
| 1,919,556 | Jacquemin | July 25, 1933 |
| 2,144,203 | Shanklin | Jan. 17, 1939 |
| 2,408,773 | Goodall | Oct. 8, 1946 |
| 2,513,315 | Hawkins | Feb. 4, 1950 |
| 2,598,290 | O'Brien | May 27, 1952 |

FOREIGN PATENTS

| Number | Country | Date |
| --- | --- | --- |
| 120,663 | Sweden | Feb. 20, 1948 |
| 630,867 | Great Britain | Oct. 24, 1949 |